No. 791,933. Patented June 6, 1905.

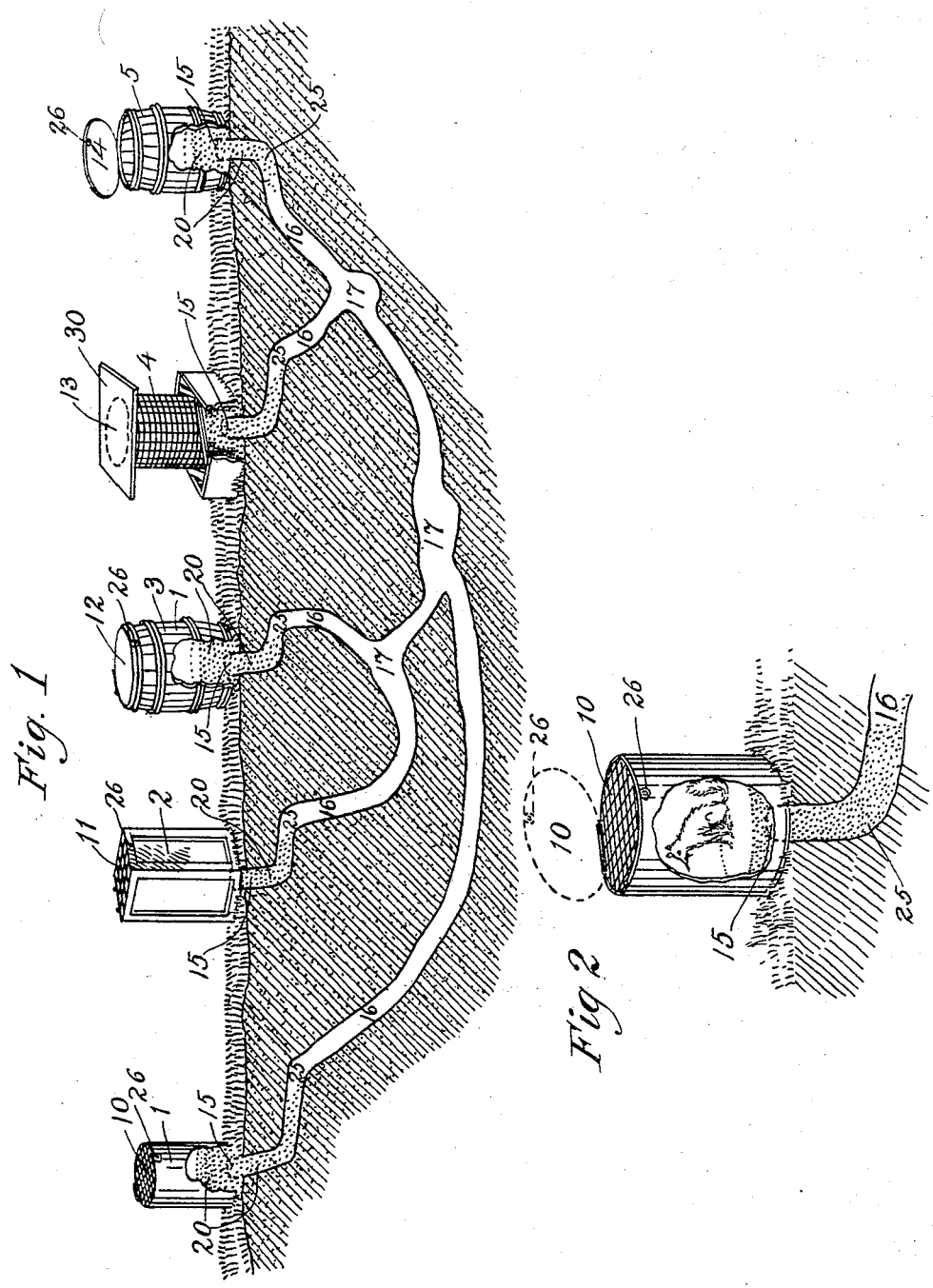

UNITED STATES PATENT OFFICE.

WILLIAM McENDREE, OF FULLERTON, CALIFORNIA.

ANIMAL-CATCHING DEVICE.

SPECIFICATION forming part of Letters Patent No. 791,933, dated June 6, 1905.

Application filed February 6, 1905. Serial No. 244,479.

*To all whom it may concern:*

Be it known that I, WILLIAM McENDREE, a citizen of the United States, residing at Fullerton, county of Orange, State of California, have invented and discovered a new and useful Improvement in Animal-Catching Devices; and I do hereby declare the following to be a full, clear, and exact description of the invention, such as will enable others skilled in the art to which it appertains to make and use the same.

This invention relates to devices for catching animals that burrow in the ground and make their beds, nests, or homes under the surface of the soil, as squirrels, gophers, and the like; and the objects of my improvement are to provide a device easily and quickly constructed, simple and effective in operation, with little outlay or expenditure of money, time, and labor.

The invention further particularly relates to the construction, combination, and arrangement of the several parts in connection with loose or dry sand or earth, reference being made to the accompanying drawings, to the figures, and to reference-numerals marked thereon; and the invention consists, essentially, in the construction, combination, and arrangement of the several parts, as will be hereinafter fully described in the specification, shown upon the drawings appended hereto, and specifically pointed out in the claims made a part hereof.

I attain these objects by the construction and arrangement of the several parts illustrated upon the accompanying drawings, in which—

Figure 1 is a perspective view of a number of my improved animal-catching devices of different shapes and sizes, partly filled with loose sand or dry earth, placed over the openings of the tracks through which burrowing animals make their exit; and Fig. 2 is a perspective view, on an enlarged scale, of one of the said devices or cages illustrated upon Fig. 1, showing an animal trapped or caged therein seated upon the sand within the cage and the lid or cover of the cage illustrated in dotted lines.

Reference-numerals 1, 2, 3, 4, and 5 denote the cages of different forms and configurations, each cage preferably provided with a hinged cover 10, 11, 12, 13, and 14, respectively. One of these devices or cages I place over each of the openings or mouths 15 15 of the tracks or paths 16 16, leading from the beds, nests, or homes 17 17, which, as illustrated upon the drawings, are enlargements of the said tracks or paths. In these enlargements are the beds, nests, and homes where burrowing animals spend the greater portion of the time when under the surface of the ground.

Before arranging and locating a series of my improved devices or cages I first determine the number of openings to be found within a circumscribed area where a family of burrowing animals feed and the corresponding tracks or paths leading from the said openings to the beds or nests of the burrowing animals hereinabove referred to. I then place one of my improved devices or cages over the mouth or opening of each of the tracks or paths, being particularly careful that each of the openings or mouths 15 is covered by one of my improved cages. I then preferably pour loose or dry sand or loose or dry earth, the latter sometimes found adjacent to the said openings, through the top of the cage after swinging the hinged lids or covers 10, 11, 12, 13, and 14 up and backward until the tracks or paths 16 16 are partly filled with the said sand or earth 20. I secure the said hinged lids or covers to the body portion of the said cages by means of suitable catches or latches 26, as illustrated upon the drawings. In order to protect the dry loose sand or earth 20 from rain, I place over the top of the said covers or lids a board 30 of suitable size and shape, as illustrated upon one of the cages shown upon Fig. 1 of the drawings. The amount of dry loose sand or earth required for filling the upper portion of the tracks or paths 16 16 will usually be determined as soon as the sand near the mouth or opening 15 ceases to descend within the said tracks 16 16. The said paths or tracks of many of the burrowing animals a short distance from the surface of the ground frequently take short or sudden bends, as shown at 25 25 upon the figures of the drawings, and at these bends in the said tracks or paths the dry loose sand or earth becomes clogged and ceases to further descend within the tracks. The cages or devices are then filled up with sand, preferably from one-quarter to one-third of their capacity or height from the surface of the ground above the mouths or openings 15 15, in order that the outcoming animal from its bed, nest, or home where the family dwell is compelled to burrow through the strata of sand or dry earth circumscribed by the lower portion of the cage before emerging into the air, there to find itself confined within the cage. The sand or earth being dry and loose, portions thereof descend behind the rear of the animal as it ascends within its track or path 16, and when the animal has reached the top of the pile of loose dry sand or earth within the lower portion of the cage, as shown upon Fig. 2 of the drawings, the animal naturally becomes frightened and finding that the dry loose sand or earth 15 has closed the hole from which it recently made exit futilely attempts to escape from the top and sides of the cage until its captor arrives. Frequent visits are made to these cages before the entrapped animals recover from the fright of capture before they begin to burrow in order to escape and are removed from the cages.

From the foregoing description, taken in connection with the accompanying drawings, it is thought that the construction, mode of operation, and advantages of the invention will be readily apparent without requiring an extended explanation.

Various changes in the form, proportion, and minor details of construction may be resorted to without departing from the principle or sacrificing any of the advantages of this invention, and I therefore reserve to myself the right to make such changes as fairly fall within the scope thereof.

Having described my invention, what I do claim, and desire to secure by Letters Patent, is—

1. A series of devices or cages for catching animals provided with covers at one end thereof, the opposite end being open and adapted to be placed over the exit-openings of tracks of burrowing animals, the lower portions of said devices or cages partially filled with dry loose sand or earth through which the animals are compelled to burrow in making exit from their subterranean homes.

2. A device for catching animals provided with a removable cover at one end, the opposite end being open and adapted to be placed over the exit-opening of the track of a burrowing animal and the lower portion of said device partially filled with dry loose sand.

3. A device or cage provided at one end with a hinged cover and fastening devices for securing the cover to the cage, a loose cover upon the top of the hinged cover, the opposite end of the said device or cage being open and adapted to be placed over the exit-opening of a track of a burrowing animal, and the said opposite end or lower portion of said device or cage partially filled with loose dry sand after having been placed over said exit-opening.

In testimony whereof I have signed my name to this specification in the presence of two subscribing witnesses.

WILLIAM McENDREE.

Witnesses:
ANNA MORGAN,
G. M. GIFFEN.